(12) United States Patent
Ellsworth et al.

(10) Patent No.: US 9,626,764 B2
(45) Date of Patent: Apr. 18, 2017

(54) SYSTEM AND METHOD FOR SYNCHRONIZING FIDUCIAL MARKERS

(71) Applicant: CastAR, Inc., Palo Alto, CA (US)

(72) Inventors: Jeri J. Ellsworth, San Jose, CA (US); Ken Clements, Los Gatos, CA (US)

(73) Assignee: CastAR, Inc., Palo Alto, CA (US)

( * ) Notice: Subject to any disclaimer, the term of this patent is extended or adjusted under 35 U.S.C. 154(b) by 29 days.

(21) Appl. No.: 14/788,483

(22) Filed: Jun. 30, 2015

(65) Prior Publication Data

US 2016/0005174 A1    Jan. 7, 2016

Related U.S. Application Data

(60) Provisional application No. 62/019,625, filed on Jul. 1, 2014.

(51) Int. Cl.
| | |
|---|---|
| *G06K 9/00* | (2006.01) |
| *G06T 7/00* | (2017.01) |
| *G06T 11/60* | (2006.01) |
| *G02B 27/01* | (2006.01) |
| *G06T 7/73* | (2017.01) |

(52) U.S. Cl.
CPC .......... *G06T 7/0042* (2013.01); *G02B 27/017* (2013.01); *G06T 7/73* (2017.01); *G06T 11/60* (2013.01); *G02B 2027/0138* (2013.01); *G02B 2027/0178* (2013.01); *G02B 2027/0187* (2013.01); *G06T 2207/30208* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 6,133,876 A * | 10/2000 | Fullerton | G01S 13/42 342/132 |
| 6,205,448 B1 | 3/2001 | Kruglikov et al. | |
| 8,081,815 B2 | 12/2011 | Kotake et al. | |
| 8,179,604 B1 * | 5/2012 | Prada Gomez | G02B 27/0093 345/8 |
| 8,434,674 B2 | 5/2013 | Mangione-Smith | |
| 8,890,773 B1 * | 11/2014 | Pederson | H04B 1/385 345/8 |
| 2005/0222713 A1 * | 10/2005 | Kawabe | B25J 19/027 700/259 |
| 2007/0147843 A1 * | 6/2007 | Fujiwara | H04B 10/1143 398/118 |

(Continued)

OTHER PUBLICATIONS

Kam, Phil "MACA—a new channel access method for packet radio." Proceedings, 9th Computer Networking Conference, pp. 134-140. ARRL/CRRL Amateur Radio, Sep. 1990.

(Continued)

*Primary Examiner* — Shervin Nakhjavan
(74) *Attorney, Agent, or Firm* — Beyer Law Group, LLP

(57) ABSTRACT

A system of active fiducial markers for pose calculation of head mounted displays is described in which information is exchanged among said markers for the purpose of synchronization. Fiducial patterns are made more easily identifiable by selective duty cycles of sub groups of synchronized emitters and means is described to propagate pose information among markers.

6 Claims, 4 Drawing Sheets

(56) References Cited

U.S. PATENT DOCUMENTS

| | | | | |
|---|---|---|---|---|
| 2008/0253766 | A1* | 10/2008 | Yu | H04B 10/1143 398/41 |
| 2008/0260391 | A1* | 10/2008 | Asukai | H04B 10/1143 398/140 |
| 2009/0067846 | A1* | 3/2009 | Yu | H04B 10/1143 398/128 |
| 2010/0045701 | A1 | 2/2010 | Scott et al. | |
| 2011/0065496 | A1 | 3/2011 | Gagner et al. | |
| 2011/0186625 | A1* | 8/2011 | Mangione-Smith | C07K 14/70503 235/375 |
| 2012/0022826 | A1* | 1/2012 | Giesekus | G01S 1/70 702/150 |
| 2013/0237811 | A1* | 9/2013 | Mihailescu | A61B 5/064 600/424 |
| 2013/0300637 | A1* | 11/2013 | Smits | G03B 35/18 345/8 |
| 2014/0100693 | A1* | 4/2014 | Fong | G05D 1/0274 700/253 |
| 2014/0140579 | A1* | 5/2014 | Takemoto | G01C 3/08 382/106 |
| 2014/0160250 | A1* | 6/2014 | Pomerantz | H04N 5/23229 348/47 |
| 2014/0265920 | A1* | 9/2014 | Pederson | H05B 33/0842 315/294 |
| 2014/0340424 | A1 | 11/2014 | Ellsworth | |
| 2015/0258432 | A1* | 9/2015 | Stafford | A63F 13/213 463/32 |

OTHER PUBLICATIONS

Adams, Norman, et al. "An infrared network for mobile computers." Proceedings USENIX Symposium on Mobile & Location-indendent Computing. vol. 10. 1993.

Kato, Hirokazu, and Mark Billinghurst. "Marker tracking and hmd calibration for a video-based augmented reality conferencing system." Augmented Reality, 1999. (IWAR'99) Proceedings. 2nd IEEE and ACM International Workshop on. IEEE, 1999.

Romer, Kay. "Time synchronization in ad hoc networks." Proceedings of the $2^{nd}$ ACM international symposium on Mobile ad hoc networking & computing. ACM, 2001.

Thou, Feng, Henry Been-Lim Duh, and Mark Billinghurst. "Trends in augmented reality tracking, interaction and display: A review of ten years of ISMAR."Proceedings of the 7th IEEE/ACM International Symposium on Mixed and Augmented Reality. IEEE Computer Society, 2008.

* cited by examiner

SYSTEM AND METHOD FOR SYNCHRONIZING FIDUCIAL MARKERS

RELATED APPLICATIONS

The present application claims the benefit of provisional patent application No. 62/019,625 filed on Jul. 1, 2014, entitled "SYSTEM AND METHOD FOR SYNCHRONIZING FIDUCIAL MARKERS" by Jeri J. Ellsworth, the entire contents of which are fully incorporated by reference herein.

U.S. PATENT DOCUMENTS

U.S. Pat. No. 6,205,448
U.S. Pat. No. 8,081,815
U.S. Pat. No. 8,434,674

U.S. PATENT APPLICATIONS

US 2010/0045701
US 2011/0065496
US 2014/0340424

OTHER PUBLICATIONS

Karn, Phil "MACA—a new channel access method for packet radio." Proceedings, 9th Computer Networking Conference, pages 134-141. ARRL/CRRL Amateur Radio, September 1990.
Adams, Norman, et al. "An infrared network for mobile computers." Proceedings USENIX Symposium on Mobile & Location-indendent Computing. Vol. 10. 1993.
Kato, Hirokazu, and Mark Billinghurst. "Marker tracking and hmd calibration for a video-based augmented reality conferencing system." Augmented Reality, 1999. (IWAR '99) Proceedings. 2nd IEEE and ACM International Workshop on. IEEE, 1999.
Römer, Kay. "Time synchronization in ad hoc networks." Proceedings of the 2nd ACM international symposium on Mobile ad hoc networking & computing. ACM, 2001.
Zhou, Feng, Henry Been-Lirn Duh, and Mark Billinghurst. "Trends in augmented reality tracking, interaction and display: A review of ten years of ISMAR." Proceedings of the 7th IEEE/ACM International Symposium on Mixed and Augmented Reality. IEEE Computer Society, 2008.

FIELD OF THE INVENTION

The present invention relates generally to fiducial "markers" used in head tracking or object tracking systems in head mounted display technology.

DESCRIPTION OF THE RELATED ART

Many head mounted display (HMD) systems depend on means to identify fixed optical fiducial patterns or "markers" so as to calculate the location and orientation or "pose" of the HMD with respect to a reference frame at the marker. In one type of this art the marker provides a pattern or dots or active light emitters that are detected by a camera or cameras mounted in the HMD. In such a system the pose of the HMD can be calculated so long as the relative position of the marker is within the effective viewing range of that camera or those cameras (see Ellsworth US 2014/0340424). Unfortunately, such a field of view may not cover the full volumetric space needed by some system users for some applications, or may be partially occluded from time to time.

SUMMARY

In order to keep a marker in view of the HMD as desired, a common practice is to simply place multiple markers throughout a viewing scene so that anywhere the HMD points, one or more markers will be in view of the mounted camera or cameras. For an embodiment using active light sources within the fiducials, this invention discloses a technique to synchronize the outputs of multiple markers so as to act as a cooperating system. In a simple embodiment, one marker is set as a master clock annunciator, which then sends time stamp sequences of pulses as radio frequency or infrared light. Other markers receive these time stamp sequences and use them to synchronize their own broadcasts of infrared light patterns such that the camera or cameras in the HMD can predict time slots in which to try to identify the maker images against an "off cycle" background.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative implementations, is better understood when read in conjunction with the appended drawings. For the purpose of illustrating the implementations, there is shown in the drawings example constructions of the implementations; however, the implementations are not limited to the specific methods and instrumentalities disclosed. Represented in the drawings.

DETAILED DESCRIPTION

Figure 1:
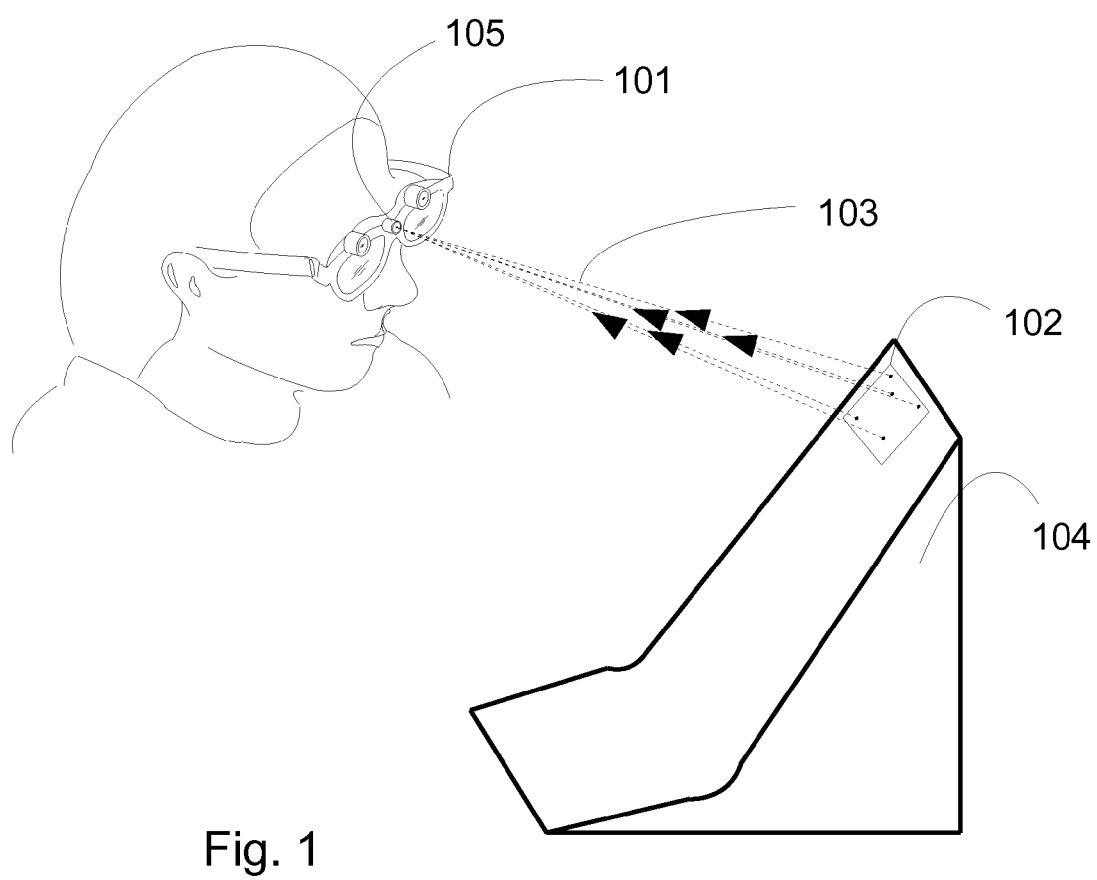
FIG. 1. —A single fiducial marker as used by a head mounted display.

FIG. 1. shows a typical arrangement of an HMD 101 and single marker 102 used in a projected augmented reality configuration. The marker 102 is attached to a retroreflective surface on a frame 104. Infrared light rays 103 are received by the camera 105 mounted in the center of the HMD frame. The received image of the fiducial pattern is calculated against the known fiducial shape pattern to determine the HMD distance and pose with regard to the fixed surface.

Figure 2:
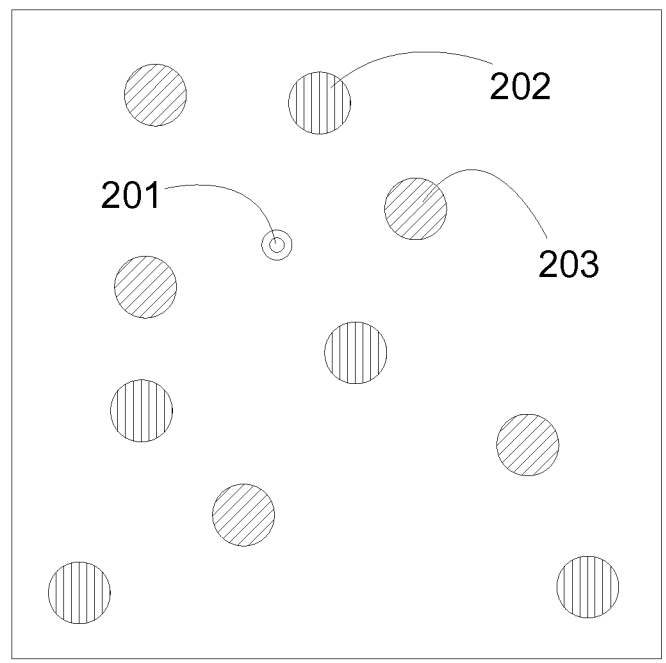
FIG. 2. —Fiducial marker detail.

A detailed representation of an embodiment of a marker is shown in FIG. 2. This marker comprises an infrared sensor 201, together with two sets of infrared light emitting patches shown by representatives 202 and 203. The battery power, wiring and control circuits are not shown. In this embodiment the control circuit may offset the timing of pulses sent by the two groups of emitters (indicated in the drawing by different hatching marks) so as to improve identification of the patterns at a plurality of orientations and/or partial occlusions. The emitters are shown as patches, however, they may also be implemented as, essentially, point sources.

Figure 3:
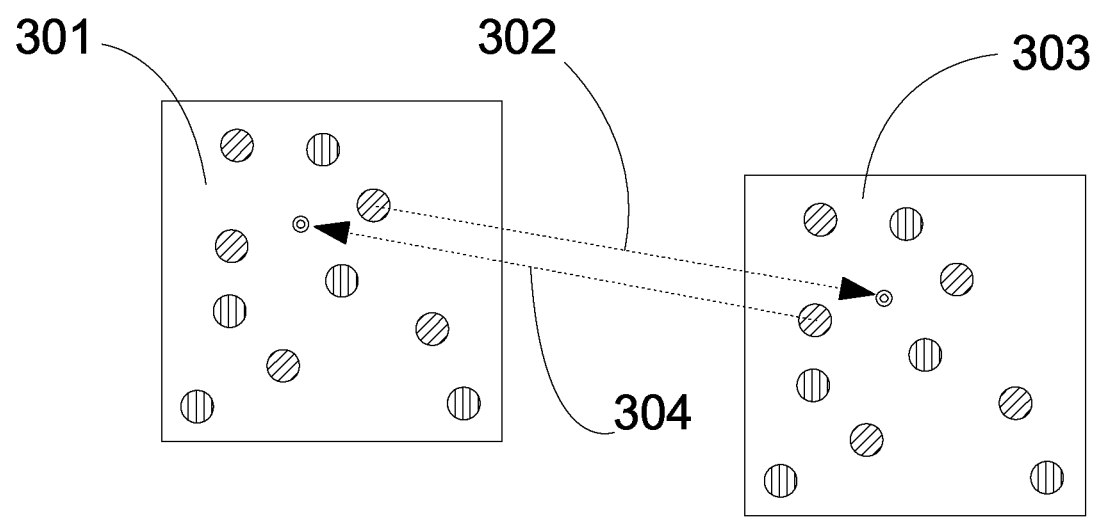
FIG. 3. —Marker to marker optical communication.

Not only are the pulses of infrared light detected as an image in the camera or cameras of the HMD, these light rays are also are detected as ambient events by the sensors on the markers themselves. This provides for a means of network node communication among the markers as shown for markers 301 and 303 in FIG. 3. There, light 302 from an emitter in marker 301 is detected and demodulated by circuits (not shown) in module 303. Such communication need not be a direct line-of-sight, but may be the result of paths that include a plurality of bounces off walls, ceilings or room objects. Each marker may have a preprogrammed identification pattern or address, or algorithms may be used to provide temporary unique identification codes as is known in network art.

Figure 4:
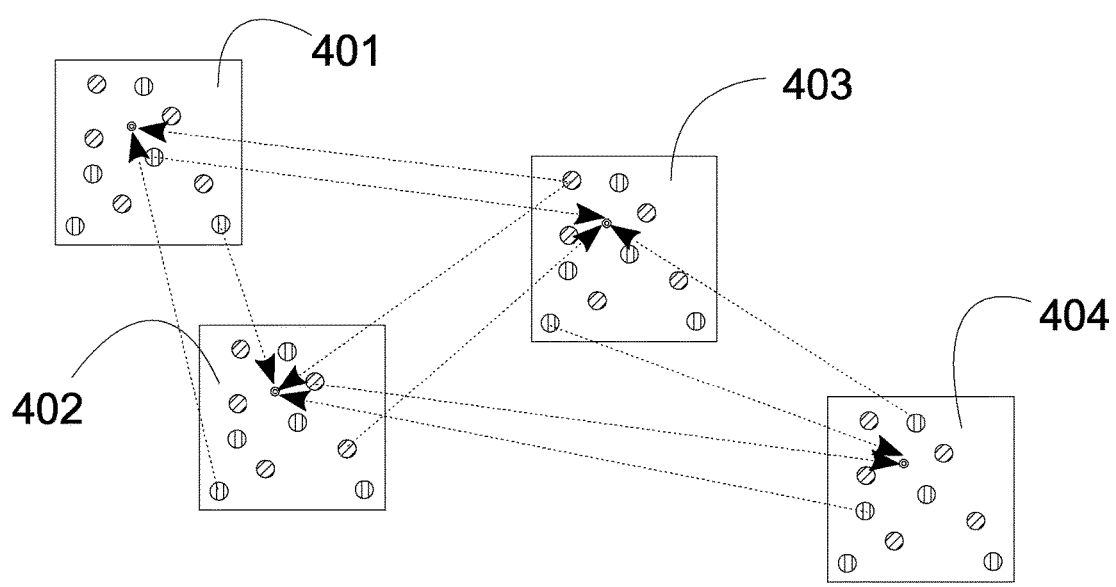
FIG. 4. —Multiple marker configuration.

As shown in FIG. 4, there may be a plurality of markers covering an area that may be much bigger than the HMD view. In this example markers 401 and 404 can each communicate with markers 402 and 403, but not directly with each other though either direct line of sight or ray reflection (bounce). Those of ordinary skill in the art of network synchronization will be able to bridge this lack of direct communication with algorithms that provide for the propagation of time stamps. As noted above, it is possible for a maker, such as 403, to be designated as a "master" from which all other markers take timing information. However, as is known in the networking art, it is also relatively straightforward for a group of network nodes to arrive at common time stamps.

Once synchronized, all markers emit their fiducial patterns during a prearranged active time slot. This time slotting allows the algorithms processing the images from the camera or cameras to compare a background image when fiducial lights are not on, with an "on" image so as to increase the contrast and make image identification more reliable.

Although shown receiving infrared light for synchronization, in another embodiment the markers may communicate with radio frequency waves, as would be implemented in, for example without limitation, a Bluetooth, Zigbee or ad hoc WiFi network, or by means of ultrasonic pulses.

In order to make use of a plurality of fiducial markers, the system that is calculating HMD pose from the received images must first register a first marker as establishing the reference coordinate system, or "world coordinates." The world coordinates of said first marker may be system parameters, or preprogrammed into said marker, or transmitted to said marker from some form of calibration device or means. From the image of this first marker, the pose of the HMD in world coordinates is calculated, and from said HMD pose, the pose of each successive marker is calculated when said marker is imaged by said HMD. Said calculated pose may then be assigned to said marker's identification.

Said first marker may be the first imaged by the HMD upon startup, or may be designated by programmed identification code or optical symbology or proximity to recognized images of environmental objects or features. Said first marker may or may not also be the source of the master timing signals.

In some embodiments the HMD units may have internal motion sensors such as gyros, accelerometers or magnetic field sensors. Such means of motion sensing may be used to update HMD pose for brief intervals when fiducial markers are not in any field of view. This updated HMD pose may subsequently be used in pose calculation of said successive markers. Internal codes may be used to indicate that such pose update information is of lower certainty than corresponding calculations made with two or more markers are simultaneously with an HMD field of view. Markers or other devices may use said internal codes to adjust weights in weighted averaging re statistical combination of multiple pose estimates.

In some embodiments the HMD may have means to transmit digital information back to fiducial markers through the infrared sensors in said markers or other wireless communication means. In such systems the HMD may transmit pose information to said successive markers allowing them to locally store the world coordinates of their own pose. Said markers may transmit this stored pose information to other nodes in the marker network or to other devices that may make use of this information, such as devices constructing a topological map of a physical installation. Local processing at said successive markers may use averaging or other statistical means to combine multiple pose estimated received from one or more HMD units, so as to decrease measured pose uncertainty (e.g. Kotake et al. U.S. Pat. No. 8,081,815).

The mobile device of the invention described herein may also be embodied as other devices such as hand held game controllers or pointing devices or other devices comprising means of collecting and using the pose information provided.

CONCLUSION

An illustrative embodiment has been described by way of example herein. Those skilled in the art will understand, however, that changes and modifications may be made to this embodiment without departing from the true scope and spirit of the elements, products, and methods to which the embodiment is directed, which is defined by our claims.

We claim:

1. A method of active fiducial marker synchronization comprising
    (a) providing a plurality of light emitting fiducial markers having means to modulate emitted light, or radio frequency, patterns and to receive and demodulate information encoded as light, or radio frequency, patterns;
    (b) encoding synchronization time stamps as modulated light patterns at a first marker and transmitting said patterns from said first marker to secondary markers;
    (c) receiving and demodulating said time stamps at one or more said secondary fiducial markers; and
    (d) using said received time stamps to set schedules for emission of patterns of light from said fiducial markers.

2. The method of claim 1 further comprising:
    (a) providing a camera or cameras having the means to image said fiducial markers;
    (b) calculating the pose of said camera or cameras relative to said fiducial markers from said images;
    (c) providing communicating means for said cameras to encode and transmit said relative pose information to said fiducial markers and providing communication means at said fiducial markers to receive and decode said information;
    (d) sending said relative pose information to said markers and receiving said pose information at said fiducial markers;
    (e) storing said relative pose information at said fiducial markers.

3. The method of claim 2 further comprising:
    (a) providing communication means for said fiducial markers to exchange said relative pose information; and
    (b) exchanging said relative pose information among said fiducial markers.

4. The method of claim 2 further comprising:
(a) providing a motion sensor at said camera or cameras; and
(b) using said motion sensor to track the motion of said camera or cameras when images of said fiducial markers are out of view.

5. The method of claim 4 further comprising using said tracked motion to calculate estimates of the relative pose of fiducial markers when said fiducial markers are brought into view.

6. The method of claim 2 further comprising using averaging or other statistical means to combine pose estimates so as to reduce pose uncertainty.

* * * * *